(12) United States Patent
Ogura et al.

(10) Patent No.: US 7,316,410 B2
(45) Date of Patent: Jan. 8, 2008

(54) FRAME STRUCTURE OF SMALL VEHICLE

(75) Inventors: Hideo Ogura, Saitama (JP); Hideo Amino, Saitama (JP); Atsushi Takasaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 110 days.

(21) Appl. No.: 10/934,574

(22) Filed: Sep. 7, 2004

(65) Prior Publication Data

US 2005/0126844 A1    Jun. 16, 2005

(30) Foreign Application Priority Data

Sep. 9, 2003    (JP) ............................ 2003-317142

(51) Int. Cl.
*B62K 1/00*    (2006.01)

(52) U.S. Cl. ...................... 280/279; 280/274; 403/298

(58) Field of Classification Search ............... 180/228, 180/227, 291, 219; 280/283, 281.1, 275, 280/284, 798, 782, 279, 274; 403/190, 271, 403/246, 298; 248/596, 646
See application file for complete search history.

(56) References Cited

U.S. PATENT DOCUMENTS

| | | | | |
|---|---|---|---|---|
| 1,760,955 A * | 6/1930 | Moss | ............................ | 403/174 |
| 3,860,265 A * | 1/1975 | Weiss | ....................... | 280/281.1 |
| 4,238,117 A * | 12/1980 | Newman | ..................... | 403/190 |
| 4,412,597 A * | 11/1983 | Aiba | ........................... | 180/228 |
| 4,529,216 A * | 7/1985 | Spekner | .................... | 280/281.1 |
| 4,673,053 A * | 6/1987 | Tanaka et al. | ............... | 180/227 |
| 4,678,054 A * | 7/1987 | Honda et al. | ................ | 180/225 |
| 5,016,725 A * | 5/1991 | Muramatsu | ................... | 180/225 |
| 5,080,384 A * | 1/1992 | Groendal et al. | ........... | 280/275 |
| 5,143,471 A * | 9/1992 | Spinner | ....................... | 403/190 |
| 5,261,504 A * | 11/1993 | Katsura | ....................... | 180/219 |
| 5,284,289 A * | 2/1994 | Killian | ......................... | 228/165 |
| 5,423,564 A * | 6/1995 | Harvey | .................... | 280/281.1 |
| 5,803,476 A * | 9/1998 | Olson et al. | .............. | 280/281.1 |
| 6,315,072 B1 * | 11/2001 | Brown et al. | ................ | 180/228 |
| 6,375,210 B1 * | 4/2002 | Lam | ......................... | 280/281.1 |
| 6,588,530 B2 * | 7/2003 | Keller et al. | ................. | 180/228 |

FOREIGN PATENT DOCUMENTS

JP    61-15686 U    1/1986

* cited by examiner

*Primary Examiner*—Hau Phan
(74) *Attorney, Agent, or Firm*—Birch, Stewart, Kolasch & Birch, LLP (57) ABSTRACT

In a frame structure of a small vehicle, an abutting surface abutting against a first frame member is provided on a second frame member constituting a part of a vehicle frame together with the first frame member. The second frame member is welded to the first frame member by an outer periphery of the abutting surface. The two frame members constituting a part of the vehicle frame are also welded together by the outer periphery of the abutting surface formed on the second frame member so as to abut against the first frame member. This achieves a decrease in the size and weight of the second frame member while sufficiently ensuring joining strength thereof. An opening portion open to an abutting surface is provided in a second frame member to expose a part of a first frame member. The second frame member is welded to the first frame member by a periphery of the opening portion.

18 Claims, 11 Drawing Sheets

FRAME STRUCTURE OF SMALL VEHICLE

CROSS-REFERENCE TO RELATED APPLICATIONS

This nonprovisional application claims priority under 35 U.S.C. § 119(a) on Patent Application No. 2003-317142, filed in Japan on Sep. 9, 2003, the entirety of which is incorporated herein by reference.

BACKGROUND OF THE INVENTION

1. Field of the Invention

The present invention relates to a frame structure of a small vehicle, in which an abutting surface abutting against a first frame member is provided on a second frame member constituting a part of a vehicle frame together with the first frame member. Furthermore, the second frame member is welded to the first frame member by an outer periphery of the abutting surface.

2. Description of Background Art

Frame structures are disclosed in Japanese Utility Model Laid-Open Publication No. S61 (1986)-15686. One frame structure is configured to weld and couple a down tube to a gusset integrally molded with a head pipe, which a vehicle frame of a motorcycle includes on a front end thereof. Another frame structure includes a gusset having an abutting surface abutting against the head pipe. The gusset is welded to the head pipe by an outer periphery of the abutting surface and a down pipe is welded and coupled to the gusset when the down pipe is coupled to the head pipe with the gusset interposed therebetween.

However, when the head pipe and the gusset are integrally molded, there is a problem in that a molding die is increased in size and becomes complicated to thereby increase the cost of molding. In addition, although the cost of molding does not increase when the gusset is welded to the head pipe, an abutting surface is provided on the gusset so as to abut against the head pipe for the purpose of increasing joining strength of the head pipe and the gusset by increasing weld length thereof. This can increase an area thereof and therefore lead to an increase in size and weight of the gusset.

SUMMARY OF THE INVENTION

The present invention was made in consideration of such circumstances. It is an object of the present invention to provide a frame structure of a small vehicle, which is configured to be capable of achieving a decrease in size and of the second frame member while sufficiently ensuring joining strength of the two frame members. This object can be accomplished by welding and coupling the two frame members constituting a part of the vehicle frame to each other by an outer periphery of an abutting surface formed on a second frame member so as to abut against a first frame member.

In order to achieve the foregoing object, according to a first aspect of the present invention, a frame structure of a small vehicle is provided, in which an abutting surface abutting against a first frame member is provided on a second frame member constituting a part of a vehicle frame together with the first frame member. The second frame member is welded to the first frame member by an outer periphery of the abutting surface. An opening portion open to the abutting surface is provided in the second frame member to expose a part of the first frame member. Furthermore, the second frame member is welded to the first frame member by a periphery of the opening portion.

According to a second aspect of the present invention, a frame structure of a small vehicle is provided, in which, on a gusset coupling a head pipe of a front end of a vehicle frame and a down pipe supporting a lower portion of an engine to each other, an abutting surface abutting against the head pipe is provided. The gusset is welded to the head pipe by an outer periphery of the abutting surface. An opening portion open to the abutting surface is provided in the gusset to expose a part of the head pipe. Furthermore, the gusset is welded to the head pipe by a periphery of the opening portion.

In accordance with the first aspect of the present invention, the second frame member is welded to the first frame member also by the periphery of the opening portion provided in the second frame member. Accordingly, a weld length of the first frame member and the second frame member can be elongated without setting the abutting surface provided on the second frame member to be large so as to abut against the first frame member. Hence, a decrease in size and weight of the second frame member can be achieved while sufficiently ensuring joining strength of the first and second frame members. In addition, changing a size and number of opening portions can change the joining strength, and accordingly, flexibility of design can be increased.

Furthermore, in accordance with the second aspect of the present invention, the gusset is welded to the head pipe also by the periphery of the opening portion provided in the gusset. Accordingly, a weld length of the head pipe and the gusset can be elongated without setting the abutting surface provided on the gusset to be large so as to abut against the head pipe. Hence, a decrease in size and weight of the gusset, which would typically be increased in size due to the fact that the head pipe is cylindrical, can be achieved while sufficiently ensuring joining strength of the head pipe and the gusset. In addition, changing a size and number of the opening portions can change the joining strength, and accordingly, flexibility of design can be increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now we described with reference to the accompanying drawings, wherein the same or similar elements have been identified by the same reference numeral throughout the several views.

Figure 1:
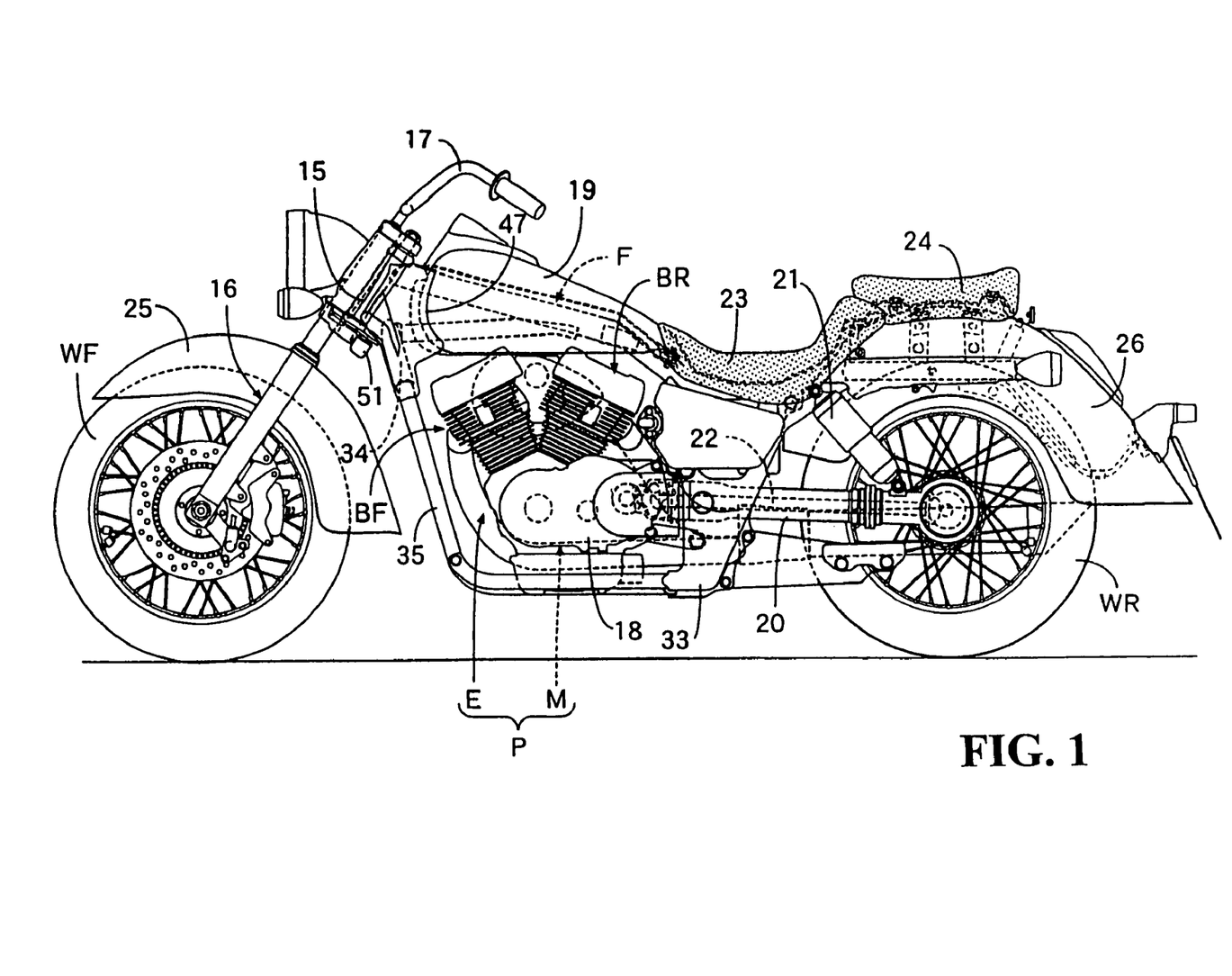
FIG. 1 is a side view of a motorcycle.

FIGS. 1 to 14 illustrate an embodiment of the present invention. In FIG. 1, a head pipe 15 is a first frame member which a vehicle frame F of a motorcycle includes at a front end thereof. A front fork 16 pivotally supporting a front wheel WF is steerably supported by the head pipe 15. A steering handle 17 is coupled to the front fork 16. In addition, a power unit P composed of an engine E and a transmission M housed in a crankcase 18 is mounted on a front portion of the above-described vehicle frame F. A fuel tank 19 is mounted on the front portion of the vehicle frame F so as to cover an upper portion of the engine E.

On the vehicle frame F in back of the above-described power unit P, front ends of a left and right pair of swing arms 20 and 20 extended in a fore-and-aft direction are supported so as to be vertically swingable. A rear wheel WR is pivotally supported between rear ends of both of the swing arms 20 and 20. In addition, between the vehicle frame F and rear portions of both of the swing arms 20 and 20, rear cushion units 21 and 21 are individually interposed. Furthermore, the left-side swing arm 20 of both of the swing arms 20 and 20 is cylindrically formed. A drive shaft 22 for transmitting power from the above-described power unit P to the rear wheel WR is housed in the left-side swing arm 20.

In addition, a main seat 23 for seating a rider is attached onto the vehicle frame F in back of the fuel tank 19. Furthermore, a pillion seat 24 for a motorcycle passenger is attached onto the vehicle frame F in back of the main seat 23.

A front fender 25 covering the front wheel WF from the above is attached onto the front fork 16. A rear fender 26 covering the rear wheel WR from the above is attached onto a rear portion of the vehicle frame F.

Figure 2:
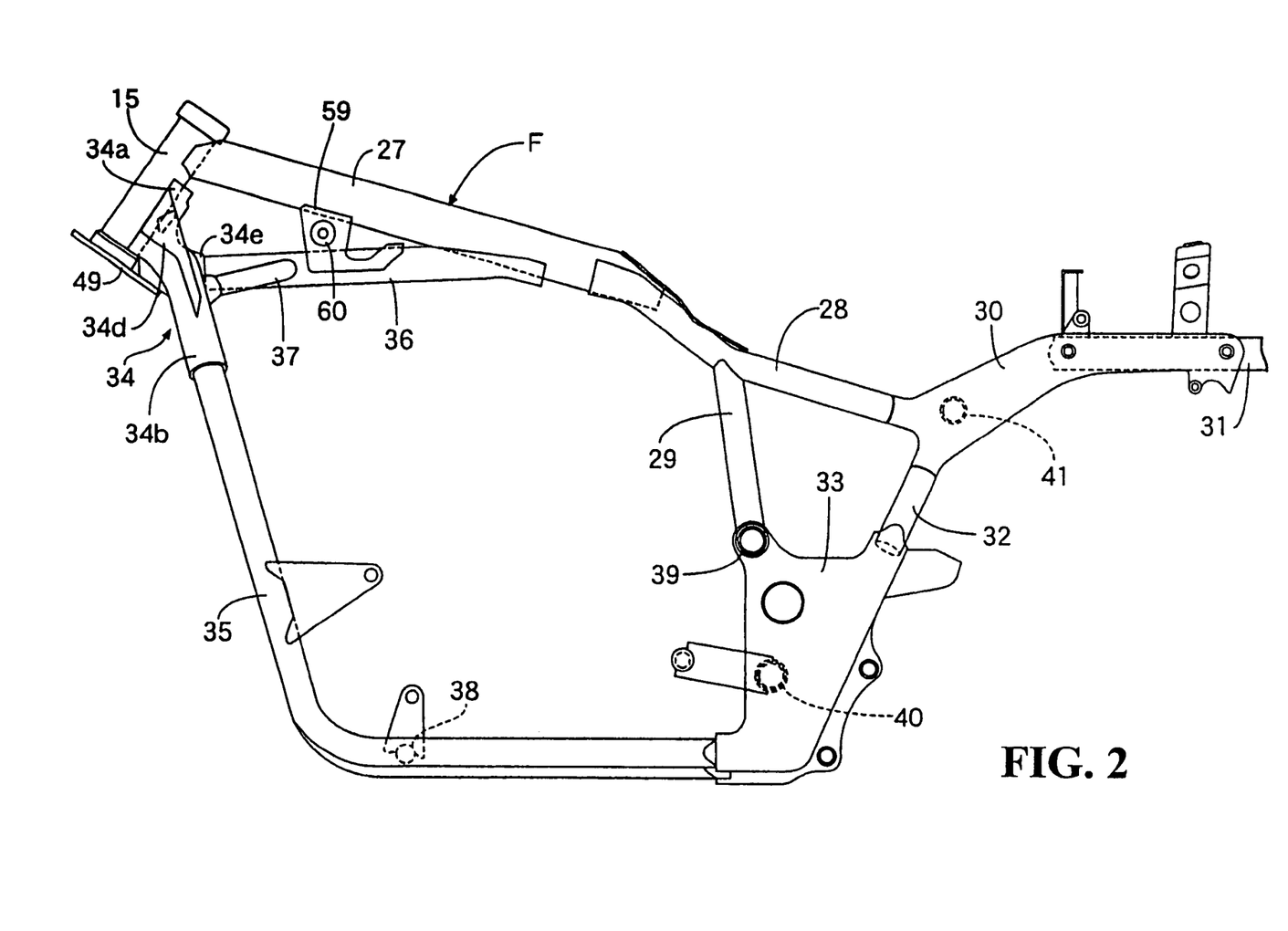
FIG. 2 is a side view of a vehicle frame.

In FIG. 2, the vehicle frame F includes the head pipe 15 on the front end thereof. A main pipe 27 extends from an upper portion of the head pipe 15 downward toward the rear. A left and right pair of center upper pipes 28 and 28 is welded to a rear portion of the main pipe 27 and extends backward. Center pipes 29 and 29 extend downward from intermediate portions of both of the center upper pipes 28 and 28. Seat rails 30 and 30, of which front-end upper portions are welded to rear ends of the center upper pipes 28, extend backward. A rear frame 31 is fastened to the individual seat rails 30 and 30 and extends backward. Rear pipes 32 and 32 extend downward from front-end lower portions of the seat rails 30 and 30. Left and right pairs of pivot plates 33 and 33 are coupled to lower portions of the center pipes 29 and 29 and the rear pipes 32 and 32. A gusset 34 as a second frame member is welded to a lower portion of the head pipe 15. A left and right pair of down pipes 35 and 35 connects the gusset 34 and the above-described pivot plates 33 and 33 to each other. A tension pipe 36 couples the gusset 34 and an intermediate portion of the main pipe 27 to each other. A left and right pair of reinforcement pipes 37 and 37 is installed between both left and right sides of the gusset 34 and a front portion of the tension pipe 36. A first cross pipe 38 connects intermediate portions of the down pipes 35 and 35 to each other. A second cross pipe 39 connects coupled portions of the center pipes 29 and 29 and the pivot plates 33 and 33 to each other. A third cross pipe 40 connects both of the pivot plates 33 and 33 to each other. A fourth cross pipe 41 connects front portions of both of the seat rails 30 and 30.

The above-described down pipes 35 are formed so that the intermediate portions are bent in a manner that front half portions extend downward toward the rear from the gusset 34 and rear half portions extend substantially horizontally toward the pivot plates 33.

The engine E is a V-type engine composed so that a front bank BF and a rear bank BR are arranged to form a substantially V-shape. A front side lower portion of the crankcase 18, which is a lower portion of the engine E, is supported by the first cross pipe 38 connecting the down pipes 35 in the above-described vehicle frame F to each other. A rear side upper portion of the above-described crankcase 18 is supported by the second cross pipe 39 connecting the coupled portions of the center pipes 29 and 29 and the pivot plates 33 and 33 to each other. A rear side lower portion of the above-described crankcase 18 is supported by the third cross pipe 40 connecting both of the pivot plates 33 and 33 to each other. Moreover, the pivot plates 33 and 33 swingably support front portions of both of the swing arms 20 and 20.

In FIGS. 3 to 7, the gusset 34 integrally includes a circular abutment support portion 34a on which an abutting surface 44 abutting against a rear side lower portion of the cylindrical head pipe 15 made of a steel pipe is provided. A left and right pair of coupling cylinder portions 34b and 34b are branched left and right from the above-described abutment support portion 34a so as to mutually form a V-shape and extended downward toward the rear. A coupling plate 34c couples the abutment support portion 34a and both of the coupling cylinder portions 34b and 34b to each other. Reinforcement ribs 34d and 34d protrude upward so as to be continuous with the coupling cylinder portions 34b and 34b and the abutment support portion 34a. A center coupling cylinder portion 34e protrudes toward the rear from a continuous portion of both of the coupling cylinder portions 34b and 34b with the abutment support portion 34a. A reinforcement rib 34f protrudes upward so as to be continuous with the center coupling cylinder portion 34e and the abutment support portion 34a. The gusset 34 is integrally cast-molded, for example, out of whiteheart malleable iron and the like.

The above-described abutment support portion 34a is welded to the head pipe 15 by an outer periphery of the above-described abutting surface 44. Front end portions of the down pipes 35 and 35 are welded to the coupling cylinder portions 34b and 34b in a state of allowing a part of each thereof to fit into a rear end of each of both of the coupling cylinder portions 34b and 34b. In addition, in the abutment support portion 34a of the gusset 34, for example, a pair of opening portions 45 and 45 open to the above-described abutting surface 44 is provided so as to expose a rear lower side face of the head pipe 15. The gusset 34 is welded to the head pipe 15 also by peripheries of these opening portions 45 and 45.

A front end portion of the tension pipe 36 is fitted into the center coupling cylinder portion 34e of the gusset 34. In this fitted state, the tension pipe 36 is welded to the center coupling cylinder portion 34e. In addition, on inward lateral surfaces in intermediate portions of both of the coupling cylinder portions 34b and 34b, as expressed in FIG. 8, fitting protruding portions 46 and 46 protrude integrally therewith. An end of each of the reinforcement pipes 37 and 37 is welded to each of the above-described coupling cylinder portions 34b and 34b in a state of allowing each of the fitting protruding portions 46 and 46 to fit thereinto. The other ends of the reinforcement pipes 37 and 37 are welded to both left and right sides of the front portion of the tension pipe 36.

Figure 3:
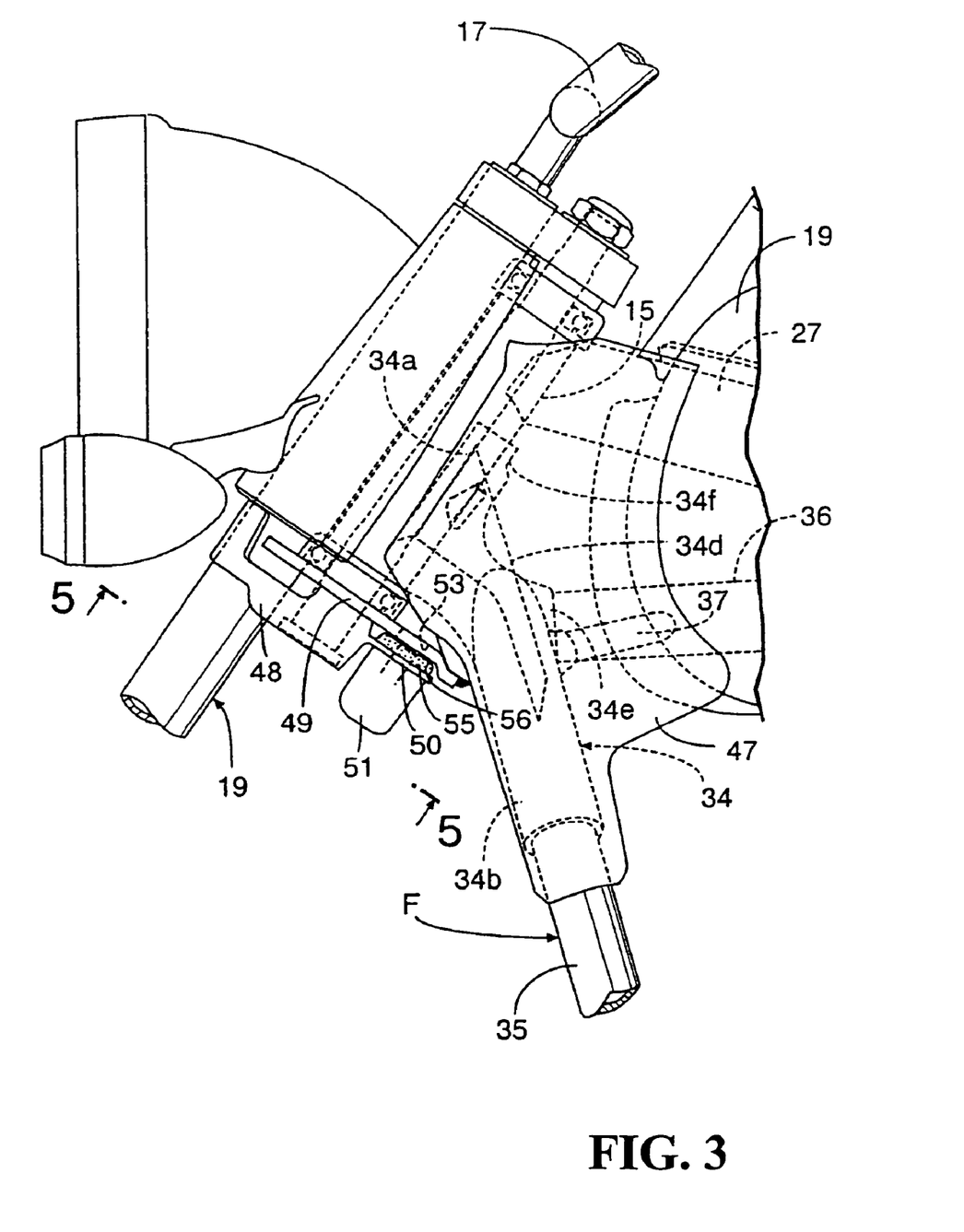
FIG. 3 is a side view showing a front portion of the motorcycle in an enlarged manner.
Figure 4:
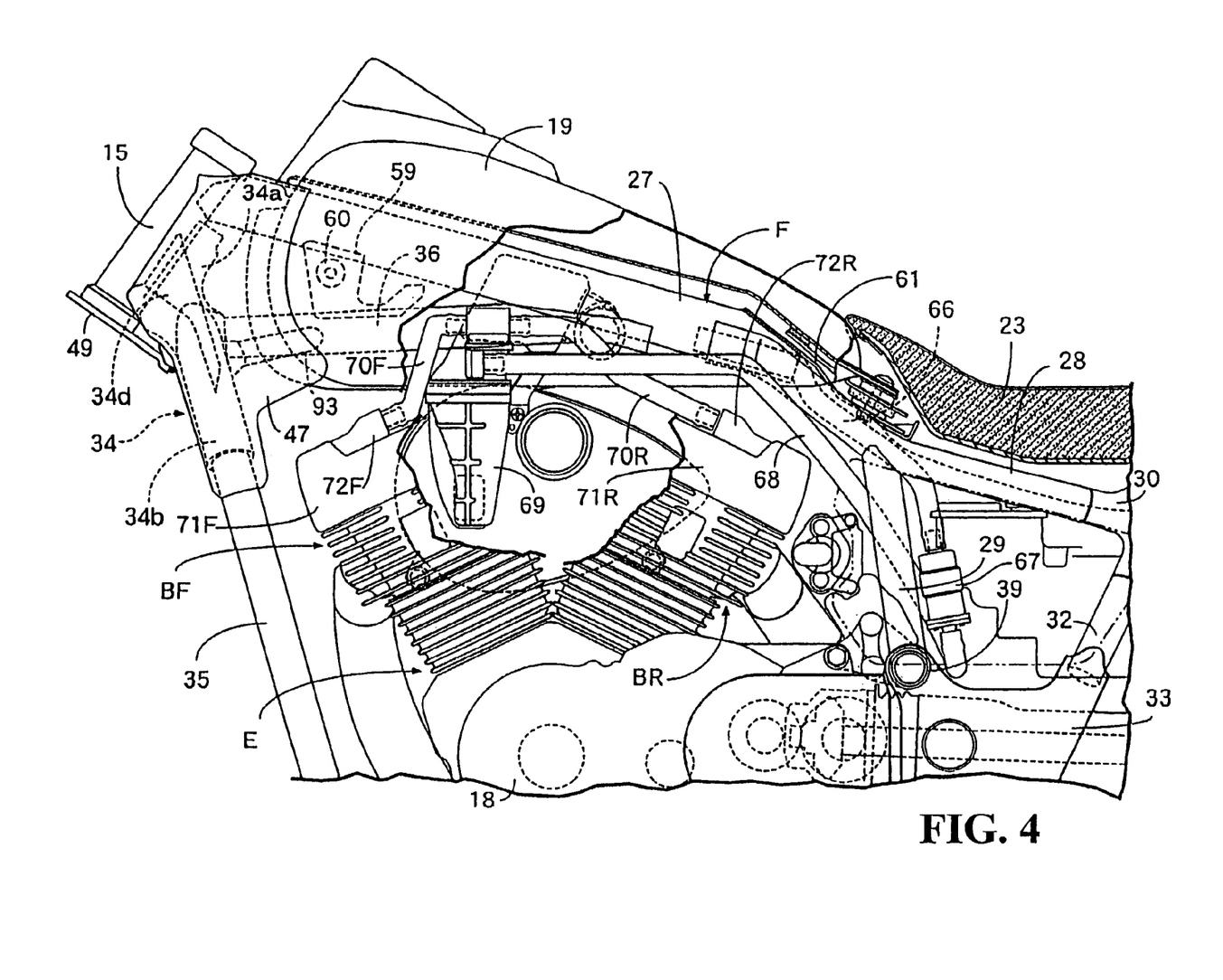
FIG. 4 is a partially cutaway side view showing a configuration of the vehicle frame in the vicinity of a fuel tank and an engine.

Incidentally, a joined portion of the gusset 34 to the head pipe 15, coupled portions of both of the down pipes 35 and 35 to the gusset 34, and a joined portion of the main pipe 17 to the head pipe 15 are covered from both left and right sides thereof with a cover 47. A rear portion of this cover 47 is brought into continuously contact with a front end portion of the fuel tank 19 smoothly.

Figure 5:
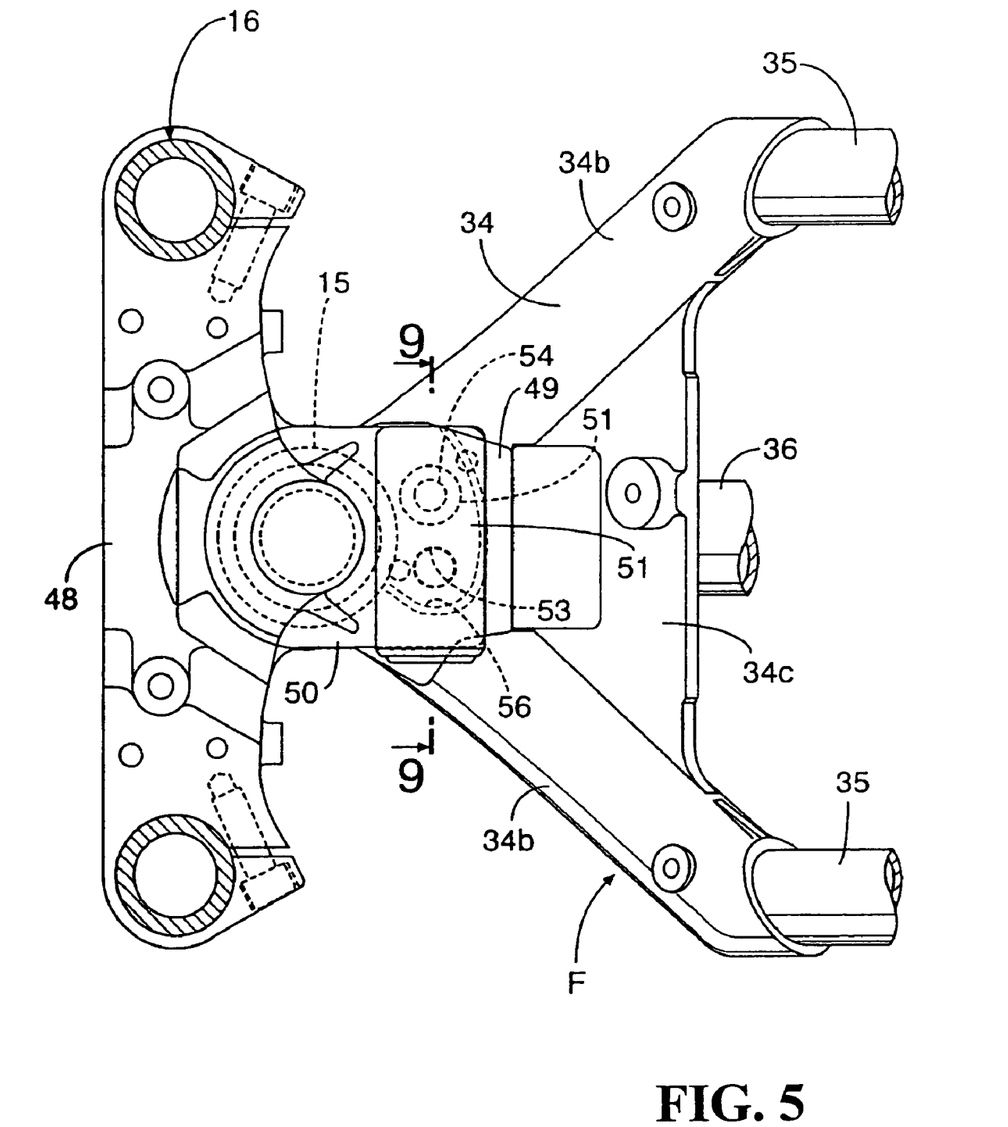
FIG. 5 is a cross-sectional view taken along a line 5-5 of FIG. 3.
Figure 6:
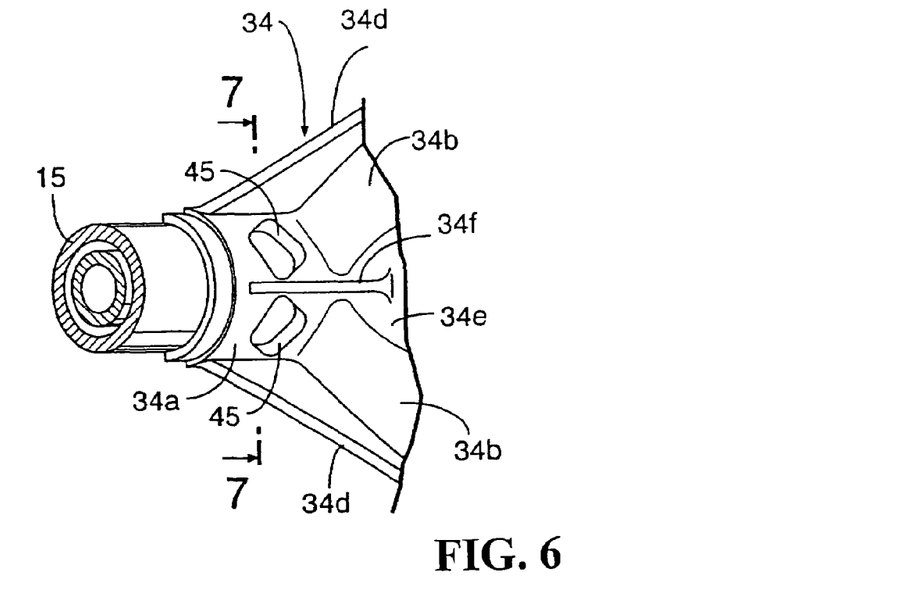
FIG. 6 is a perspective view of a joined portion of a head pipe and a gusset, viewed obliquely from behind.
Figure 7:
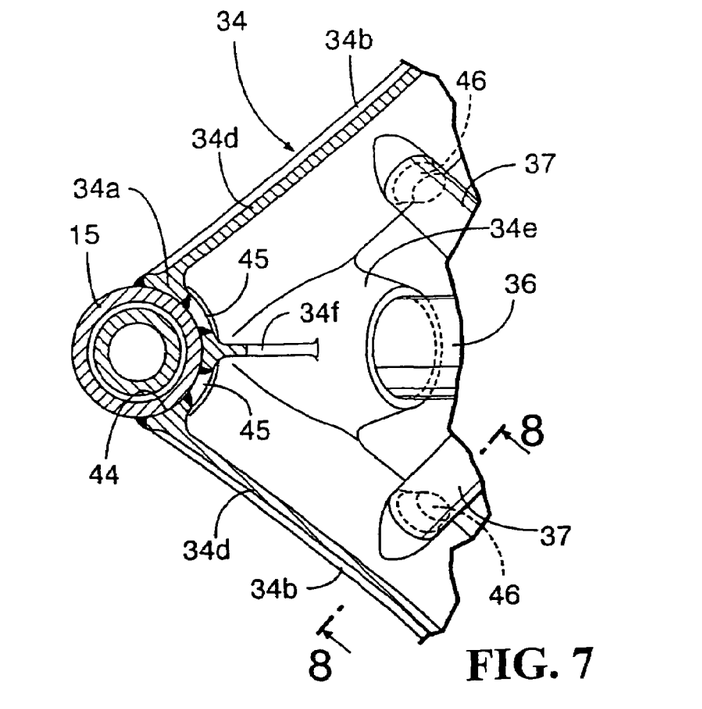
FIG. 7 is a cross-sectional view taken along a line 7-7 of FIG. 6.
Figure 8:
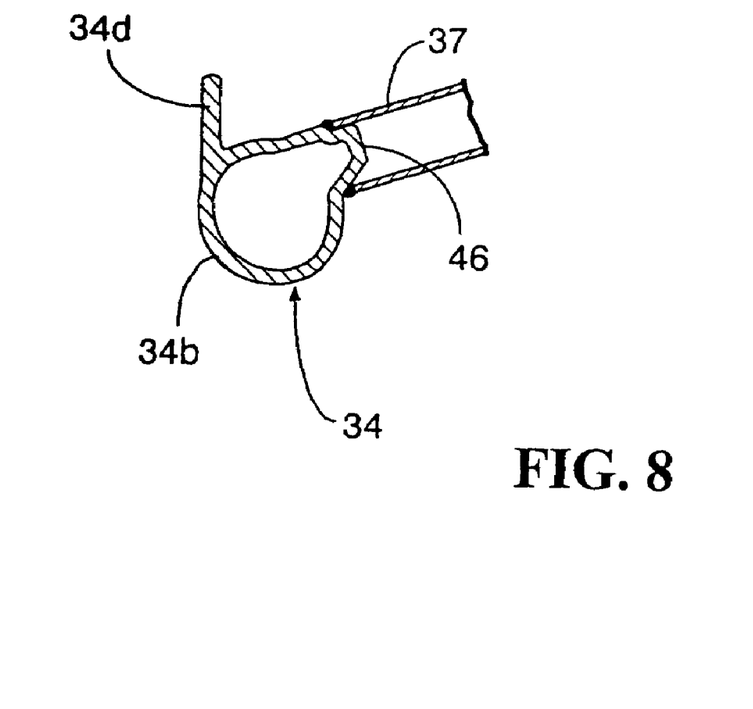
FIG. 8 is a cross-sectional view taken along a line 8-8 of FIG. 7.
Figure 9:
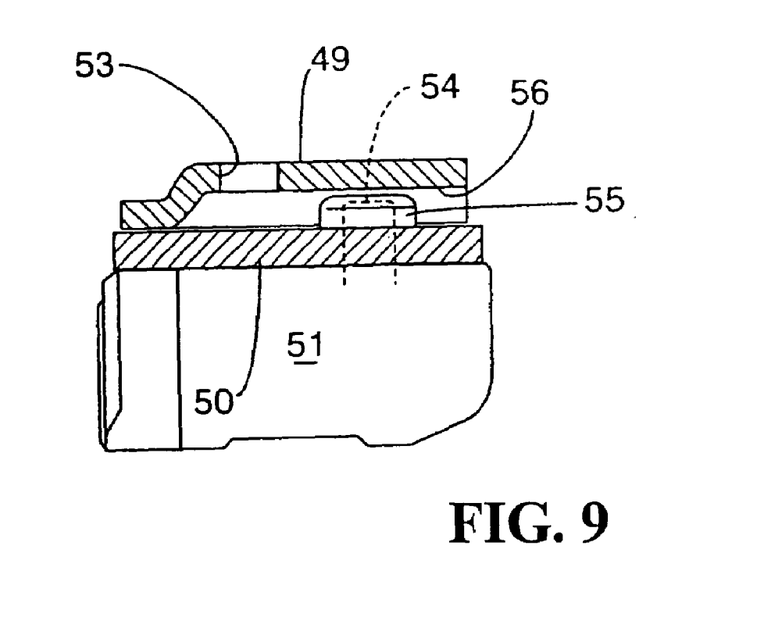
FIG. 9 is a cross-sectional view taken along a line 9-9 of FIG. 5.

In FIGS. 3, 5 and 9, a lock plate 49 is welded to the head pipe 15 and the gusset 34 so as to be located above a bottom bridge 48 which the front fork 16 includes. A cylinder lock 51 into which a key 52 can be inserted from a right side of the motorcycle is attached onto a lower surface of a support plate 50 fixedly provided to the bottom bridge 48 and extended backward.

A lock hole 53 is provided in the lock plate 49. In addition, the cylinder lock 51 is includes a lock pin 54 penetrating the support plate 50 freely movably and protruding upward thereof for the purpose of being detachably fitted into the lock hole 53. The lock pin 54 moves in an axial direction by an operation for the key 52 between an upper portion where the lock pin 54 can be fitted into the above-described lock hole 53 and a lower position where the fitting thereof into the lock hole 53 is released. Even in a state where the lock pin 54 is at the lower position, an upper end of the lock pin 54 protrudes upward from the support plate 50.

Figure 10:
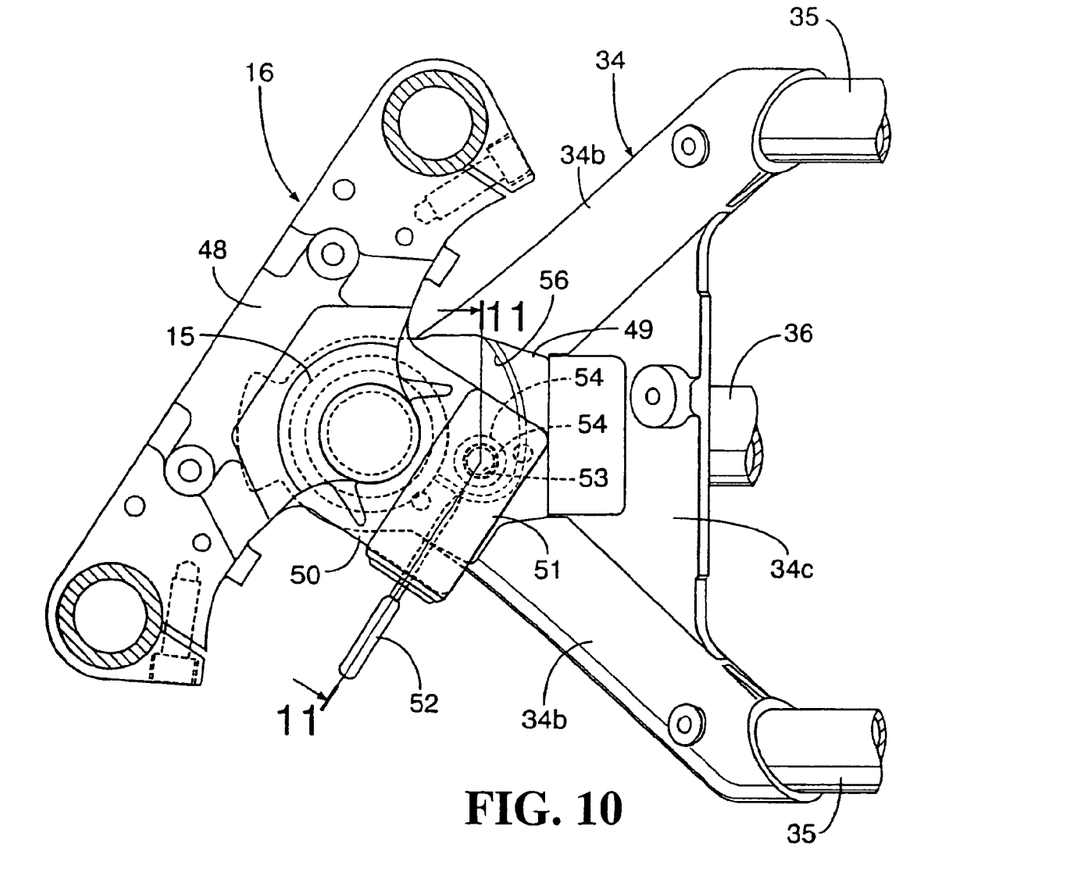
FIG. 10 is a cross-sectional view in a handle-lock state, corresponding to FIG. 5.
Figure 11:
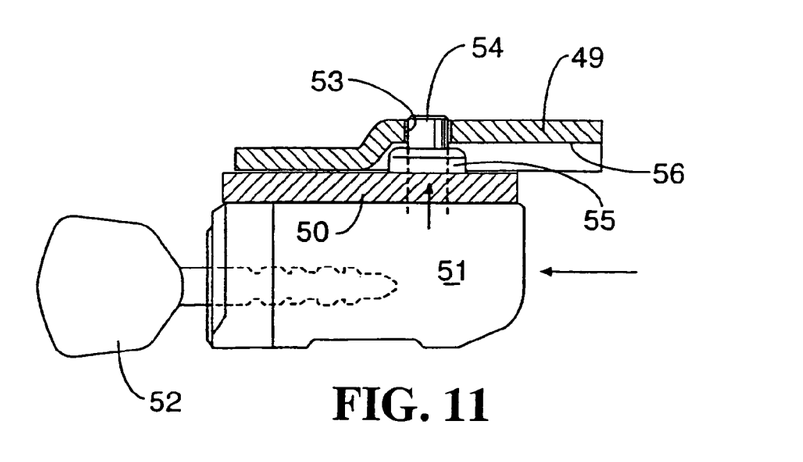
FIG. 11 is a cross-sectional view taken along a line 11-11 of FIG. 10.

With regard to relative positions of the above-described lock hole 53 and lock pin 54, when the front wheel WF is steered to a straight-ahead state, the lock pin 54 is at a position shifted from the lock hole 53 as shown in FIGS. 5 and 9. However, when the front wheel WF is operated to turn to a left-turning side by a predetermined angle, as shown in FIGS. 10 and 11, the lock pin 54 is set so as to be located at a position where the lock pin 54 is fittable into the lock hole 53. Specifically, the handle-lock state can be obtained in a state where the steering handle 17 is steered to the left side.

In addition, a concave portion 56 is provided on a lower surface of the lock plate 49 for permitting a turn of the lock pin 54 protruding upward from the support plate 50 when the above-described support plate 50 and cylinder lock 51 are made to turn by the steering operation for the steering handle 17 with respect to the lock plate 49 welded to the head pipe 15 and the gusset 34. Furthermore, in the above-described concave portion 56, a collar 55 surrounding the lock pin 54 is housed. The collar 55 is rotatable about the lock pin 54.

Figure 12:
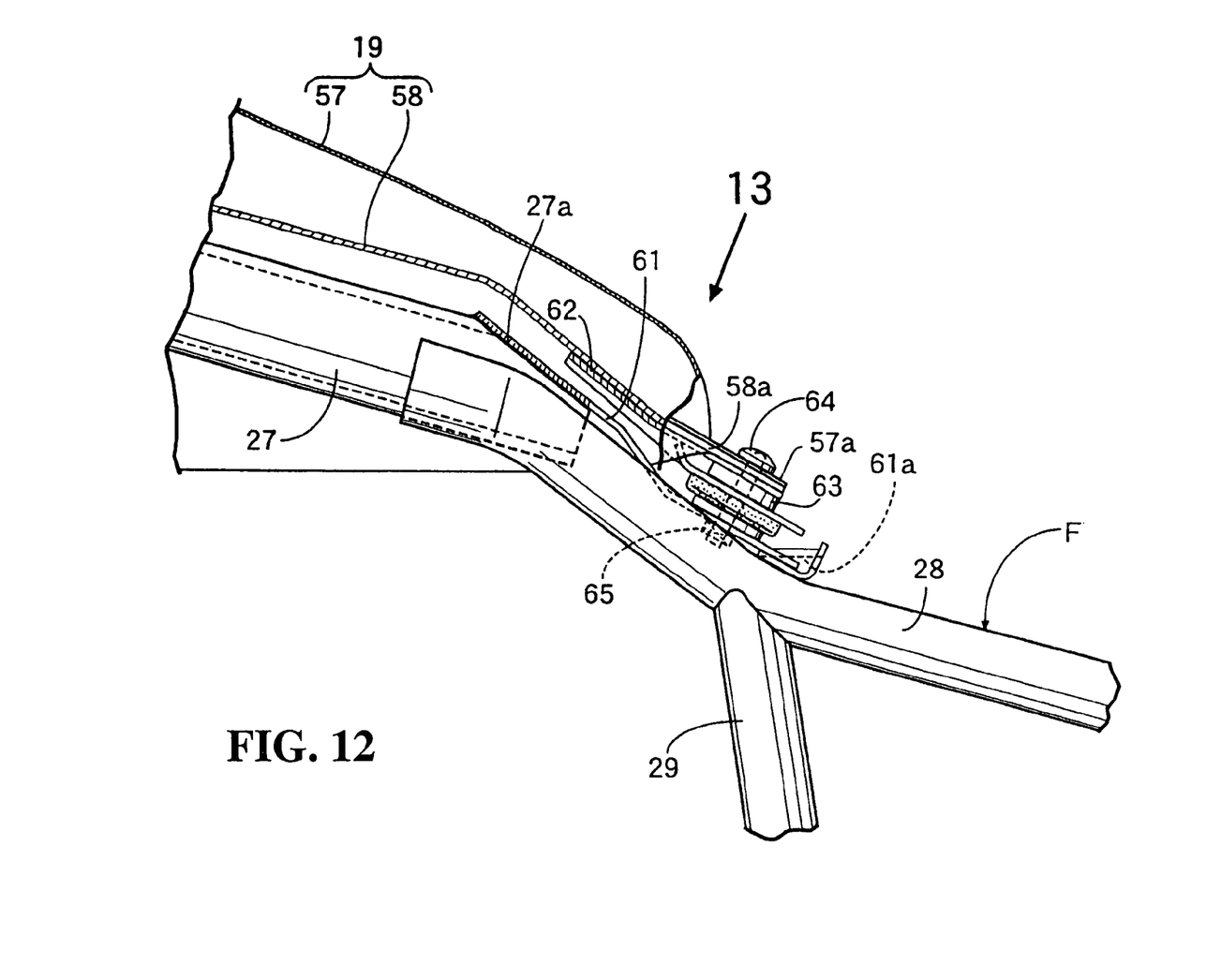
FIG. 12 is a vertical sectional side view of a vicinity of a rear portion of the fuel tank.
Figure 13:
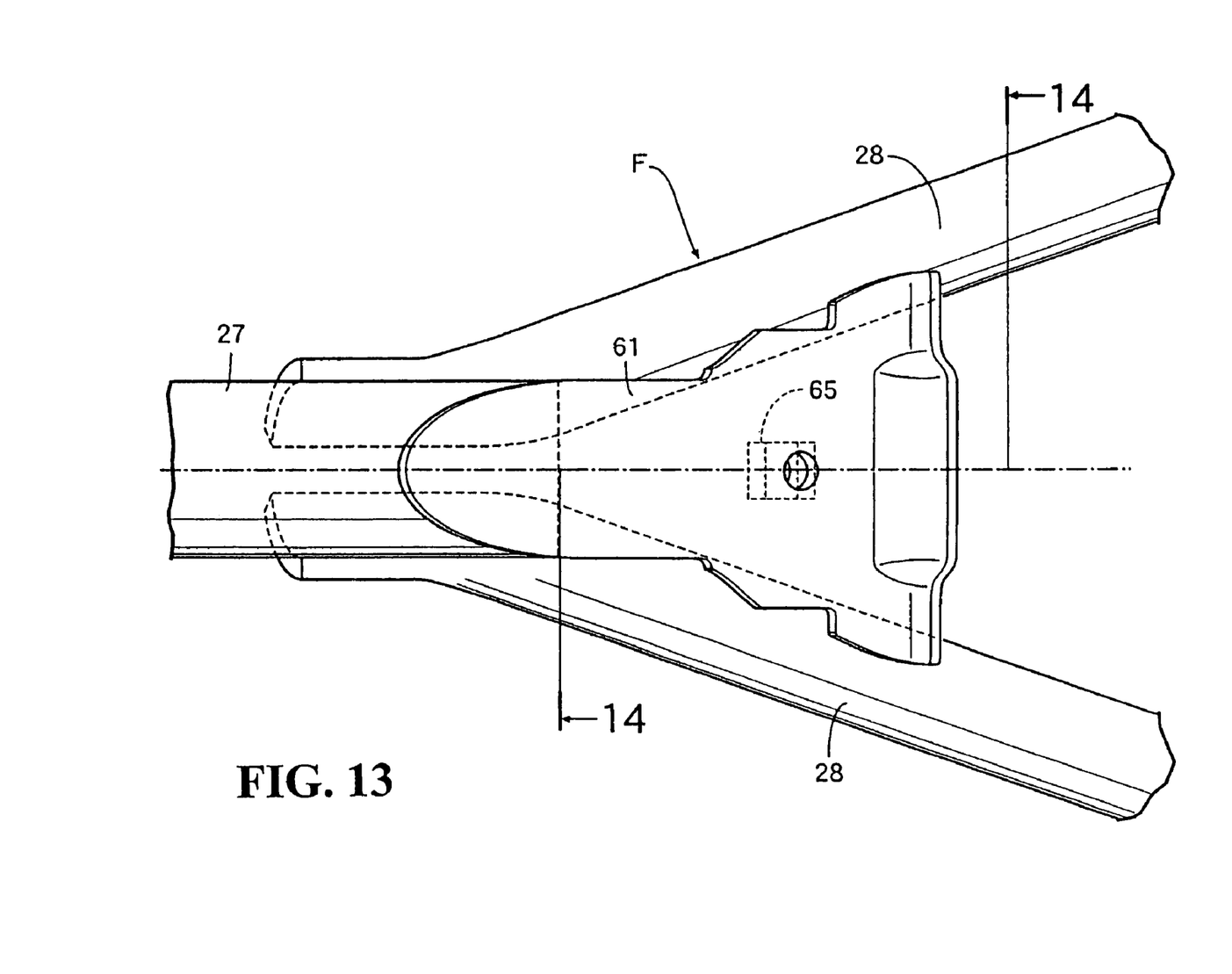
FIG. 13 is a view of a part of the vehicle frame, viewed from a direction of an arrow 13 of FIG. 12.
Figure 14:
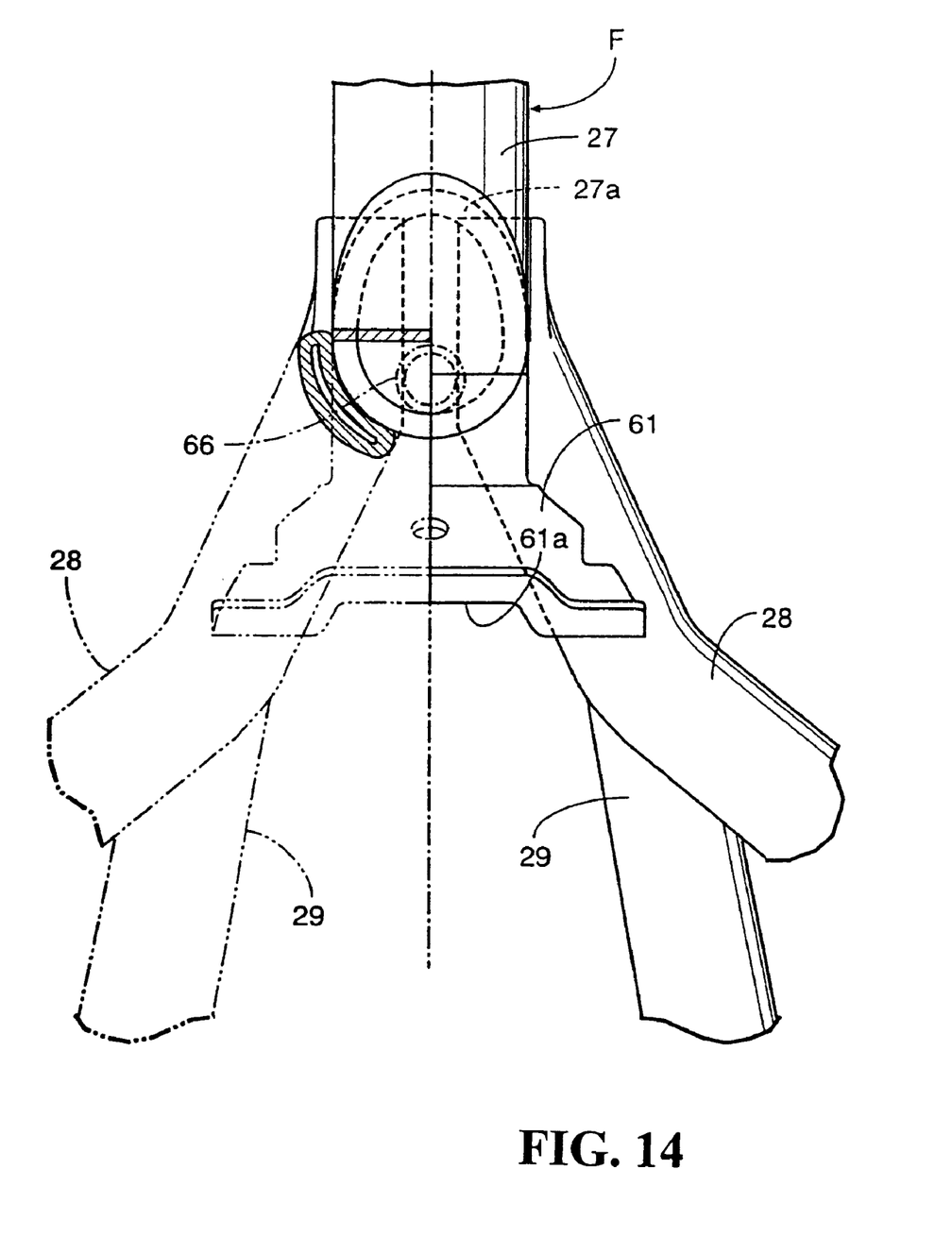
FIG. 14 is a cross-sectional view taken along a line 14-14 of FIG. 13.

In FIGS. 12 to 14, a rear end of the main pipe 27 in the vehicle frame F is open. Front end portions of both of the center upper pipes 28 are welded to both sides of the rear portion of the main pipe 27. Each of the center upper pipes 28 is pressed into a circular arc shape so as to be along an outer peripheral surface of the main pipe 27.

Incidentally, the fuel tank 19 is composed of an upper-half member 57 and a lower-half member 58 by mutually joining flange portions 57a and 58a, which both of the half members 57 and 58 include on peripheral portions thereof. The fuel tank 19 is formed so as to have a substantially U-shaped lateral section shape of which a lower portion is opened so as to be astride the main pipe 27 from above.

A front portion of the fuel tank 19 is elastically supported on the vehicle frame F by being fitted from the rear to mount rubbers 60 and 60 attached onto both left and right sides of a support plate 59 fixedly attached onto the tension pipe 36. In addition, in order to support a rear portion of the fuel tank 19, a support stay 61 is fixedly attached onto the rear portion of the main pipe 27.

On a rear upper portion of the main pipe 27, an attachment surface 27a facing to the oblique rear is formed by cutting out a part of the main pipe 27. The above-described support stay 61 is fixedly attached onto the above-described attachment surface 27a and extends to the rear more than the fuel tank 19. A lower portion of a rear end of the main pipe 27 is kept open in a state where the support stay 61 is fixedly attached onto the rear portion of the main pipe 27.

In addition, an attachment plate 62 opposite to the above-described support stay 61 from above is fixedly attached onto a rear lower surface of the fuel tank 19. In a state where an elastic material 63 is sandwiched between the attachment plate 62 and the support stay 61, a screw member 64 inserted from above through the above-described flange portions 57a and 58a, attachment plate 62, elastic material 63 and support stay 61 is screwed into a weld nut 65 welded to a lower surface of the support stay 61, the screw member 64 is then tightened. Thus, the rear portion of the fuel tank 19 will be elastically supported on the vehicle frame F.

Moreover, an introduced concave portion 61a open to the rear is formed on a lower surface of a rear end of the support stay 61. A front portion of the main seat 23 is introduced into this introduced concave portion 61a.

Incidentally, hoses 66 for intake of secondary air are inserted into the main pipe 27 from the open end of the lower portion of the rear end thereof One end of the hoses 66 is opened in an intermediate portion in the main pipe 27. Thus, the secondary air can be inhaled so that sand and dust wound up by the front wheel WF and the like cannot intrude into the secondary air.

In addition, the insertion portions of the above-described hoses 66 into the main pipe 27 are sandwiched between the lower portion of the rear end of the main pipe 27 and the support stay 61 fixedly attached onto the rear portion of the main pipe 27. It is not necessary to provide, in the vehicle frame F, a bracket and the like for supporting the hoses 66. Thus it is possible to contribute to a reduction in the number of parts.

Furthermore, a pair of air cleaners 67 and 67 for the secondary air, which are connected in parallel, are arranged in back of the engine E so as to be supported by the center pipes 29 of the vehicle frame F. The other ends of the above-described hoses 66 are connected in parallel to inlets of both of the air cleaners 67 and 67 for the secondary air.

In addition, hoses 68 of which one ends are connected in parallel to outlets of both of the air cleaners 67 and 67 for the secondary air extend forward along the center pipes 29, the center upper pipes 28 and the main pipe 27. The other ends of the above-described hoses 68 are connected to a secondary air control valve 69 disposed above the front bank BF in the engine E.

The secondary air control valve 69 controls an amount of the secondary air for purifying exhaust from both of the banks BF and BR in the engine E. The secondary air measured by the secondary air control valve 69 is guided by a pair of secondary air supply hoses 70F and 70R branched from the secondary air control valve 69. In addition, connecting pipes 72F and 72R for guiding the secondary air are provided in head covers 71F and 71R in both of the above-described banks BF and BR. The above-described secondary air supply hoses 70F and 70R are connected to the connecting pipes 72F and 72R.

An operation of this embodiment will now be described. The abutting surface 44 abutting against the head pipe 15 is provided in the gusset 34 coupling the head pipe 15 of the front end of the vehicle frame F and the down pipes 35 and 35 supporting the lower portion of the engine E to each other. The gusset 34 is welded to the head pipe 15 by the outer periphery of the abutting surface 44. In the gusset 34, for example, the pair of opening portions 45 and 45 open to the abutting surface 44 is provided so as to expose a part of the side face of the head pipe 15. Also, the gusset 34 is welded to the head pipe 15 by the peripheries of the above-described opening portions 45 and 45.

Specifically, the gusset 34 is welded to the head pipe 15 also by the peripheries of the opening portions 45 and 45 in addition to the outer periphery of the abutting surface 44. Accordingly, a weld length of the head pipe 15 and the gusset 34 can be elongated without setting, the abutting surface 44 provided on the gusset 34 to be large so as to abut against the head pipe 15. Hence, a decrease in size and weight of the gusset 34 can be achieved while sufficiently ensuring joining strength of the head pipe 15 and the gusset 34, even though the gusset 34 would typically be increases in size due to the fact that the head pipe 15 is cylindrical.

In addition, the joining strength can be changed by changing the size and number of the opening portions 45. Accordingly, flexibility of design can be increased.

While the embodiment of the present invention has been described above, the present invention is not one limited to the foregoing embodiment, and it is possible to perform a variety of design changes without departing from the present invention described in the scope of claims.

For example, while the coupling structure of the head pipe 15 and the gusset 34, which constitute a part of the vehicle frame F, has been explained in the foregoing embodiment, the present invention can be carried out widely in connection with a coupling structure of a pair of frame members constituting a part of a vehicle frame. In addition, the present invention can be applied not only to a motorcycle, but also to a small vehicle such as a motor tricycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle frame structure of a small vehicle, comprising:
   a first frame member;
   a second frame member, said second frame member including an abutting surface abutting against said first frame member, said second frame member being welded to said first frame member by an outer periphery of the abutting surface,
   wherein an opening portion open to the abutting surface is provided in said second frame member to expose a part of said first frame member, and said second frame member is welded to said first frame member by a periphery of the opening portion, the periphery of the opening portion being different than the outer periphery of the abutting surface.

2. The vehicle frame structure according to claim 1, wherein said second frame member includes an abutment support portion, a pair of coupling portions branched from the abutment support portion and a coupling plate coupling the abutment support portion and the pair of coupling portions, the abutting surface being provided on the abutment support portion.

3. The vehicle frame structure according to claim 2, wherein said second frame member further includes reinforcement ribs protruding upwardly from the pair of coupling portions, the reinforcement ribs being continuous with the abutment support portion and the pair of coupling portions.

4. The vehicle frame structure according to claim 3, wherein said second frame member further includes a center coupling portion protruding from a continuous portion of both of the pair of coupling portions with the abutment support portion, and a reinforcement rib protrudes upward to be continuous with the center coupling portion and the abutment support portion.

5. The vehicle frame structure according to claim 4, further comprising:
   a pair of third frame members, said pair of third frame members being connected to the pair of coupling portions, respectively; and
   a fourth frame member, said fourth frame member being connected to said center coupling portion.

6. The vehicle frame structure according to claim 5, further comprising a pair of fifth frame members, said pair of fifth frame members being connected between one of said pair of coupling portions and said fourth frame member, respectively.

7. A vehicle frame structure of a small vehicle, comprising:
   a head pipe;
   a down pipe for supporting a lower portion of an engine; and
   a gusset coupling said head pipe and said down pipe to each other, said gusset including an abutting surface abutting against the head pipe, said gusset being welded to said head pipe by an outer periphery of the abutting surface,
   wherein an opening portion open to the abutting surface is provided in the gusset to expose a part of the head pipe, and said gusset is welded to the head pipe by an inner periphery of the opening portion.

8. The vehicle frame structure according to claim 7, wherein said gusset includes an abutment support portion, a pair of coupling portions branched from the abutment support portion and a coupling plate coupling the abutment support portion and the pair of coupling portions, the abutting surface being provided on the abutment support portion.

9. The vehicle frame structure according to claim 8, wherein said gusset further includes reinforcement ribs protruding upwardly from the pair of coupling portions, the reinforcement ribs being continuous with the abutment support portion and the pair of coupling portions.

10. The vehicle frame structure according to claim 9, wherein said gusset further includes a center coupling portion protruding from a continuous portion of both of the pair of coupling portions with the abutment support portion, and a reinforcement rib protrudes upward to be continuous with the center coupling portion and the abutment support portion.

11. The vehicle frame structure according to claim 10, further comprising:
   a pair of down pipes, said pair of down pipes being connected to the pair of coupling portions, respectively; and
   a tension pipe, said tension pipe being connected to said center coupling portion.

12. The vehicle frame structure according to claim 11, further comprising a pair of reinforcement pipes, said pair of reinforcement pipes being connected between one of said pair of coupling portions and said tension pipe, respectively.

13. A vehicle frame structure of a small vehicle, comprising:
   a first frame member;
   a second frame member, said second frame member including an abutment support portion having an abutting surface abutting against said first frame member, said second frame member being welded to said first frame member around an outer periphery of the abutting surface,
   wherein an aperture is formed through the abutment support portion and the abutting surface to expose a part of said first frame member, and said second frame member is welded to said first frame member around an inner periphery of the aperture.

14. The vehicle frame structure according to claim 13, wherein said second frame member further includes a pair of coupling portions branched from the abutment support portion and a coupling plate coupling the abutment support portion and the pair of coupling portions.

15. The vehicle frame structure according to claim 14, wherein said second frame member further includes reinforcement ribs protruding upwardly from the pair of coupling portions, the reinforcement ribs being continuous with the abutment support portion and the pair of coupling portions.

16. The vehicle frame structure according to claim 15, wherein said second frame member further includes a center coupling portion protruding from a continuous portion of both of the pair of coupling portions with the abutment support portion, and a reinforcement rib protrudes upward to be continuous with the center coupling portion and the abutment support portion.

17. The vehicle frame structure according to claim 16, further compnsing:
   a pair of third frame members, said pair of third frame members being connected to the pair of coupling portions, respectively; and
   a fourth frame member, said fourth frame member being connected to said center coupling portion.

18. The vehicle frame structure according to claim 17, further comprising a pair of fifth frame members, said pair of fifth frame members being connected between one of said pair of coupling portions and said fourth frame member, respectively.

\* \* \* \* \*